(12) United States Patent
Melhorn

(10) Patent No.: US 7,500,448 B1
(45) Date of Patent: Mar. 10, 2009

(54) SELF-PROPELLED POULTRY CAGE HANDLER AND METHOD

(76) Inventor: J. Michael Melhorn, 612 W. Main St., Mount Joy, PA (US) 17552

(*) Notice: Subject to any disclaimer, the term of this patent is extended or adjusted under 35 U.S.C. 154(b) by 167 days.

(21) Appl. No.: 11/534,009

(22) Filed: Sep. 21, 2006

Related U.S. Application Data

(60) Provisional application No. 60/722,593, filed on Sep. 30, 2005.

(51) Int. Cl.
*B60P 3/04* (2006.01)

(52) U.S. Cl. ........................................ 119/401

(58) Field of Classification Search .............. 119/401, 119/414, 415; 414/555, 621; 294/119.1; 187/237
See application file for complete search history.

(56) References Cited

U.S. PATENT DOCUMENTS

| | | | | |
|---|---|---|---|---|
| 2,468,999 A | * | 5/1949 | Rettler | 414/623 |
| 2,956,700 A | * | 10/1960 | Quayle | 414/623 |
| 2,983,397 A | * | 5/1961 | Hirschboeck | 414/623 |
| 3,272,364 A | * | 9/1966 | Mindrum et al. | 414/622 |
| 3,866,780 A | * | 2/1975 | Miller et al. | 414/623 |
| 3,895,727 A | | 7/1975 | Rucker | |
| 4,020,793 A | * | 5/1977 | Morrison | 119/479 |
| 4,084,714 A | | 4/1978 | Williams | |
| 4,331,320 A | * | 5/1982 | Naruse et al. | 254/2 R |
| 4,342,393 A | * | 8/1982 | Box | 206/504 |
| 4,354,795 A | * | 10/1982 | Dutra, Jr. | 414/622 |
| 4,365,591 A | * | 12/1982 | Wills et al. | 119/845 |
| 4,544,323 A | * | 10/1985 | Malin | 414/785 |
| 4,619,579 A | * | 10/1986 | Frison | 414/607 |
| 4,710,091 A | * | 12/1987 | Ochiai et al. | 414/623 |
| 5,006,034 A | * | 4/1991 | Bragg et al. | 414/555 |
| 5,374,155 A | * | 12/1994 | Van Baale et al. | 414/607 |
| 5,476,353 A | * | 12/1995 | Mola | 414/373 |
| 5,660,147 A | | 8/1997 | Wills et al. | |
| 5,975,029 A | | 11/1999 | Morimoto et al. | |
| 6,149,370 A | | 11/2000 | DiBartolomeo | |
| 6,477,987 B2 | | 11/2002 | Taylor | |
| 6,612,918 B2 | | 9/2003 | Livingston et al. | |
| 6,623,232 B2 | | 9/2003 | Cattaruzzi | |
| 6,655,897 B1 | | 12/2003 | Harwell | |
| 6,880,488 B1 | * | 4/2005 | Hall | 119/846 |

* cited by examiner

*Primary Examiner*—Son T. Nguyen
(74) *Attorney, Agent, or Firm*—Howson Howson LLP

(57) ABSTRACT

A self-propelled vehicle is provided for use in transporting poultry loaded in a wheeled multi-tier cage from a first location to a second location, such as through the tight confines of a poultry house. The apparatus has a gripper assembly for releasably laterally engaging and disengaging one end of the cage above its fixed wheels and a lifter assembly disposed below the gripper assembly for selectively raising and lowering the cage adjacent its fixed wheels. The apparatus also has self-propelled drive wheels enabling linear and pivotal translation of the apparatus and cage along a support surface, such as the floor of the poultry house. Accordingly, the cage can be coupled to the apparatus and decoupled therefrom for efficient transportation of live poultry within a poultry house. A method of moving live poultry within a poultry house is also provided.

12 Claims, 6 Drawing Sheets

SELF-PROPELLED POULTRY CAGE HANDLER AND METHOD

CROSS-REFERENCE TO RELATED APPLICATIONS

This application claims the benefit under 35 USC §119(e) of U.S. Provisional Patent Application No. 60/722,593, filed Sep. 30, 2005.

BACKGROUND OF THE INVENTION

The present invention relates to handling mobile poultry carts within poultry houses, and more particularly, the present invention relates to a self-propelled vehicle for safely pushing, pulling, and manipulating poultry carts within narrow aisles of poultry houses.

Chicken and like poultry are typically grown in high density cages within poultry houses. An average-sized poultry house may house about 85,000 to 100,000 live chickens. The high density cages are typically aligned in rows extending substantially the full length of the poultry house, and a narrow aisle, or walkway, extends between each adjacent pair of rows permitting access to the high density cages. An example, an average-sized poultry house may have seven such aisles each being approximately 500 feet in length.

Chicken and like poultry are typically required to be relocated to and from various types of poultry houses, processing plants and the like. For example, chicks are typically permitted to grow for about eighteen weeks in a nursing house and are then relocated to a "layer" house for egg production and collection. At the end of the egg laying cycle, the chickens are relocated to processing plants. Transporting poultry to and from poultry houses and processing plants typically requires the poultry to be removed from cages and placed in mobile multi-compartmented poultry carts. Each cart typically holds about 150 to 200 live chickens and weighs approximately 600 to 800 pounds when fully loaded. Filling and/or emptying an average-sized poultry house typically requires the use of about 450 to 500 carts each of which must be loaded and/or unloaded and pushed throughout the length of the poultry house.

Each cart has a relatively rectangular frame supporting multiple tiers of cages. The front and rear ends of each cart are typically supported on fixed and/or caster wheels. U.S. Pat. Nos. 4,084,714 issued to Williams and 3,895,727 issued to Rucker disclose examples of mobile poultry carts. Due to the limited space available within the narrow aisles of poultry houses, the carts are required to be manually pushed and/or pulled through the aisles of the poultry house. As an example, an individual worker on a daily basis may be required to manually push carts for a total distance of about one to two miles. Accordingly, the manual handling of mobile poultry carts is both a labor intensive and potentially dangerous procedure considering the significant size, weight, and number of carts and the distance that they must be traversed.

In addition to loading and unloading live poultry, other duties relating to the maintenance of a poultry house include removing mortality on a daily basis and assuring a steady flow of eggs throughout the poultry house. Other duties include replacing light bulbs, repairing and replacing motors, and checking for water leaks. To fulfill such duties, maintenance employees are required to walk each aisle of the poultry house at least two to three times per day.

By way of example, known systems for handling poultry are disclosed by U.S. Pat. Nos. 6,623,232 B2 issued to Cattaruzzi; 5,476,353 issued to Mola; 5,660,147 and 4,365,591 issued to Wills et al.; 4,342,393 issued to Box; 4,020,793 issued to Morrison; 6,655,897 B1 issued Harwell; 6,477,987 B2 issued to Taylor; 5,975,029 issued to Morimoto et al.; and 6,612,918 B2 issued to Livingston et al.

Although the above referenced poultry handling systems may be satisfactory for their intended purposes, there is a need for an improved apparatus and method for handling poultry within the narrow confines of poultry houses. Preferably, the apparatus and method should enable safe and efficient handling of fully loaded multi-compartmented carts within and through narrow aisles of poultry houses.

BRIEF SUMMARY OF THE INVENTION

According to a first aspect of the present invention, an apparatus is provided for use in transporting poultry loaded in a wheeled multi-tier cage from a first location to a second location, such as through a poultry house. The apparatus has a gripper assembly for releasably laterally engaging and disengaging one end of the cage above its fixed wheels and a lifter assembly disposed below the gripper assembly for selectively raising and lowering the cage adjacent its fixed wheels. The apparatus has a self-propelled pair of drive wheels enabling linear and pivotal translation of the apparatus and cage along a support surface, such as the floor of a poultry house. Preferably, the gripper and lifter assemblies are connected to the apparatus adjacent the drive wheels. Accordingly, the cage can be coupled to the apparatus and decoupled therefrom for efficient transportation of live poultry within a poultry house.

According to another aspect of the present invention, a method is provided for transferring live poultry from a first location to a second location in a moveable multi-tier cage. Preferably, the cage has a set of fixed wheels and a set of caster wheels enabling the cage to be displaced and pivoted on a support surface, such as the floor of a poultry house. The cage is gripped laterally above the fixed wheels and lifted vertically to elevate the fixed wheels above the support surface. Thereafter, the cage is displaced along the support surface while being gripped and lifted.

BRIEF DESCRIPTION OF THE DRAWINGS

The features and advantages of the present invention should become apparent from the following description when taken in conjunction with the accompanying drawings, in which.

DETAILED DESCRIPTION OF THE INVENTION

Figure 1:
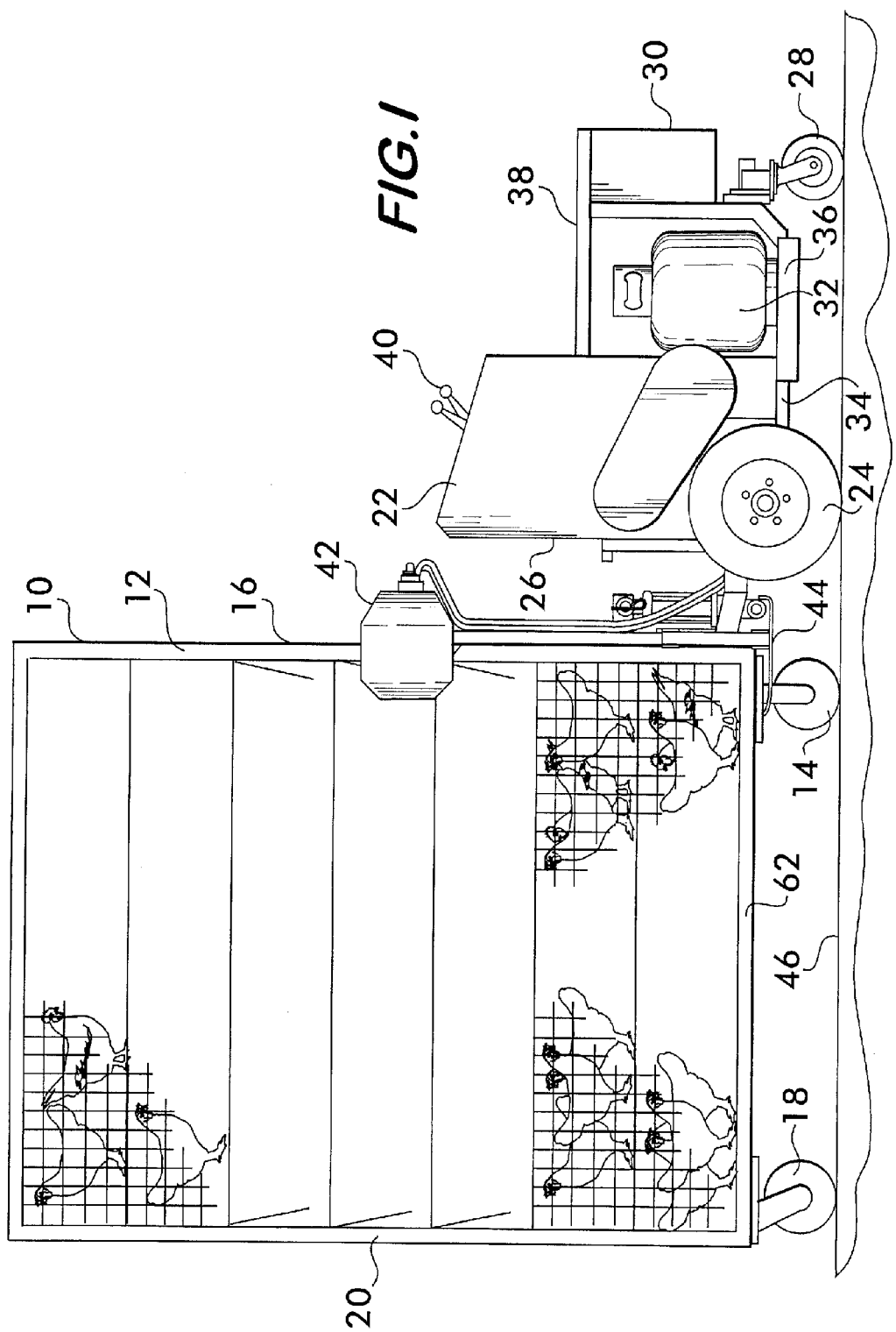
FIG. 1 is a side elevational view of a multi-compartmented poultry cage and a self-propelled vehicle according to the present invention.
Figure 2:
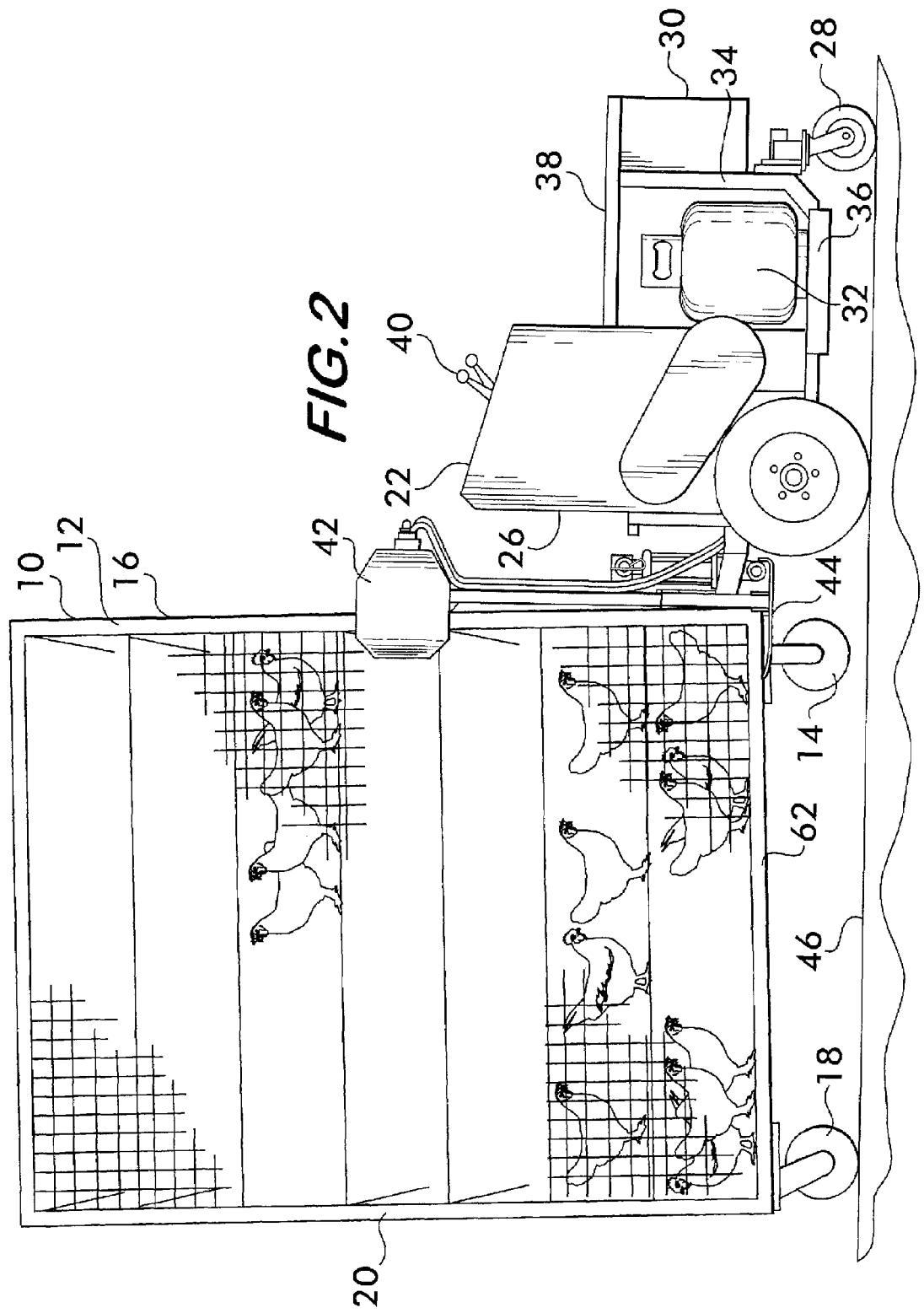
FIG. 2 is a side elevational view of a multi-compartmented poultry cage gripped and lifted by the self-propelled vehicle according to the present invention.

A multi-tiered, multi-compartmented cart 10 for transporting poultry in cages is shown in FIGS. 1 and 2. Preferably, the cart 10 has a substantially rectangular frame 12 permitting it to pass through narrow aisles of a poultry house (not shown). The frame 12 is supported on wheels, more preferably, a set of fixed wheels 14 on one end 16 of the cart 10 and a set of caster wheels 18 on an opposite end 20. As an example, the cart 10 can be sized to hold about 150 to 200 live chickens and weight about 600 to 800 lbs when fully loaded. According to conventional practice, the cart 10 is manually pushed/pulled through the narrow aisles of poultry houses and manually loaded or unloaded with live poultry.

Figure 3:
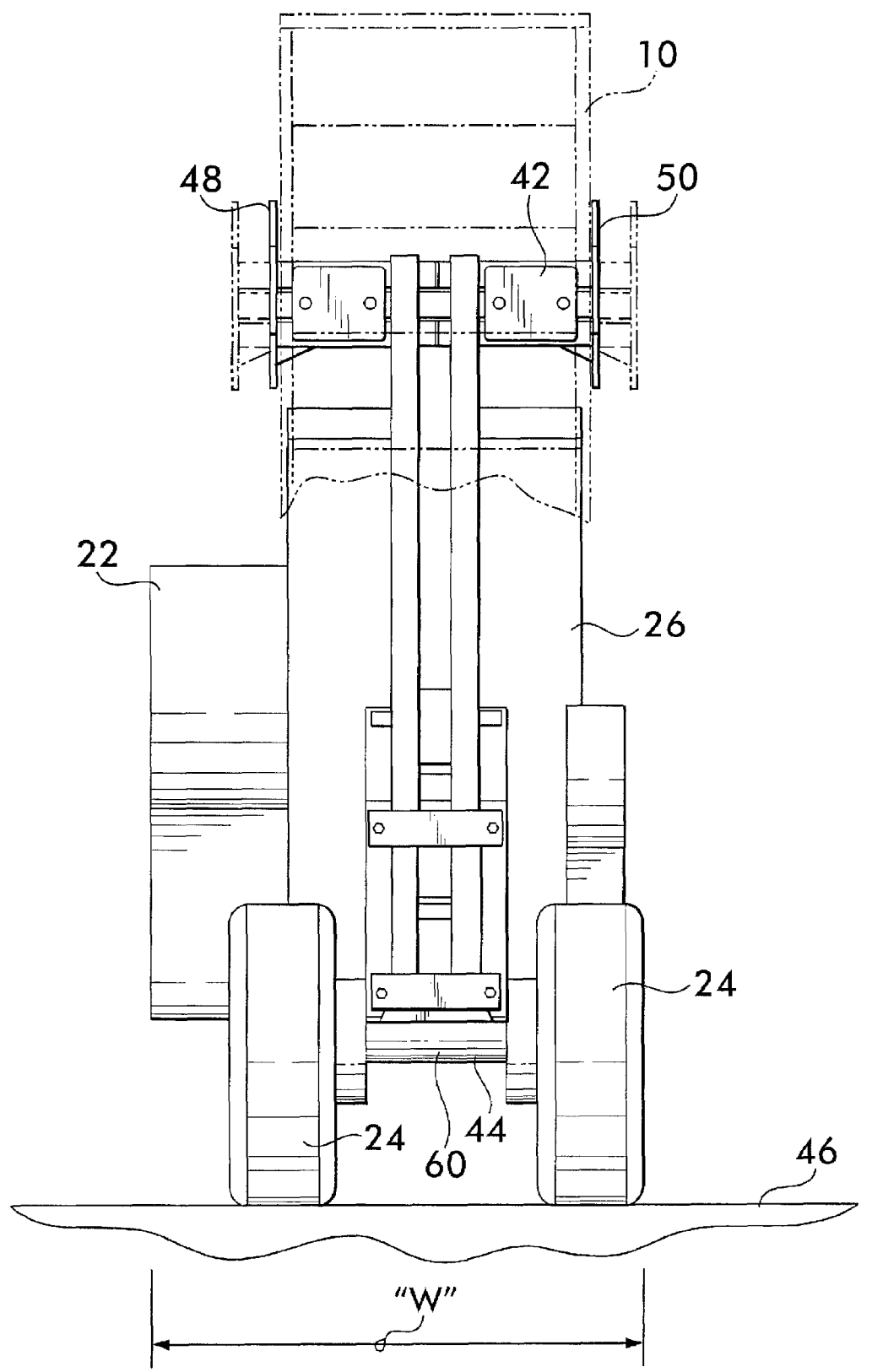
FIG. 3 is a front elevational view of the self-propelled vehicle according to the present invention with a cage shown partly in phantom.

A self-propelled vehicle, or transporter, 22 according to the present invention is also illustrated in FIGS. 1 and 2. The vehicle 22 can be used to push and/or pull the cart 10 within a poultry house and has a sufficiently narrow front profile, as best illustrated in FIG. 3, to permit the vehicle 22 to be driven within the narrow aisles of poultry houses. Use of the vehicle 22 eliminates the need of manually pushing/pulling of the carts 10. By way of example, the vehicle 22 can have a maximum width "W" of about 21.5 inches. Of course, the vehicle 22 can be designed with other dimensions, as desired.

Preferably, an operator of the vehicle 22 distributes carts 10 throughout the poultry house to allow workers to load and/or unload live poultry onto or from the carts 10. Thereafter, the operator utilizes the vehicle 22 to remove the carts 10 from the poultry house and to load the carts 10 onto trucks or the like which deliver the poultry to other poultry houses or processing plants. The use of the vehicle 22 automates the process of filling and/or emptying a poultry house and decreases injuries and fatigue typically experienced by workers required to manually push carts 10 through poultry houses. In addition, the vehicle 22 can be used by a maintenance employee to carry various tools and other equipment within the poultry house and to transport the employee through the aisles for routine inspections several times a day.

The vehicle, or transporter, 22 has a pair of drive wheels 24 preferably located at a front end 26 thereof and a pair of caster wheels 26 preferably located at a rear end 30 thereof. The drive wheels 24 can be powered by LP gas or like energy source contained in a tank 32 supported on the frame 34 of the vehicle 22. An operator can stand on rails 36 or sit on platform 38 of the frame 34 of the vehicle 22. Alternatively, the operator can walk behind the vehicle 22. Controls 40 enable the operator to control the speed and direction of movement of the vehicle 22 and the operation of gripping and lifting assemblies 42 and 44 that are preferably located at the front 26 of the vehicle 22 adjacent the drive wheels 24.

The gripping assembly 42 is used to engage and/or release opposite lateral sides of the end 16 of the cart 10. Preferably, the gripper assembly 42 is used to grasp the end of the cart directly above the fixed wheels 14 of the cart 10. This stabilizes the cart 10 and prevents it from tipping over when end 16 is lifted by the vehicle 22. In addition, this enables ready control and steering of the cart 10 since the caster wheels 18 of the cart remain in contact with the underlying floor or surface.

The lifting assembly 44 is located below the gripping assembly 42 and is used to lift the end 16 of the cart 10 off the underlying floor or surface. For instance, see fixed wheel 14 relative to surface 46 illustrated in FIG. 2. After the vehicle 22 lifts the end 16 of the cart 10 off the ground, the vehicle/cart combination is in condition for movement within the poultry house. In this condition, the vehicle/cart combination contacts the underlying floor 46 via the caster wheels 18 at the front end 20 of the cart 10, the drive wheels 24 of the vehicle 22, and the caster wheels 28 of the vehicle 22 at a rearward most end of the combination. This arrangement provides the vehicle and cart combination with essentially zero turning radius capability so that the cart and vehicle can be maneuvered through narrow openings and around obstacles or tight corners within limited confines of a poultry house.

Figure 4:
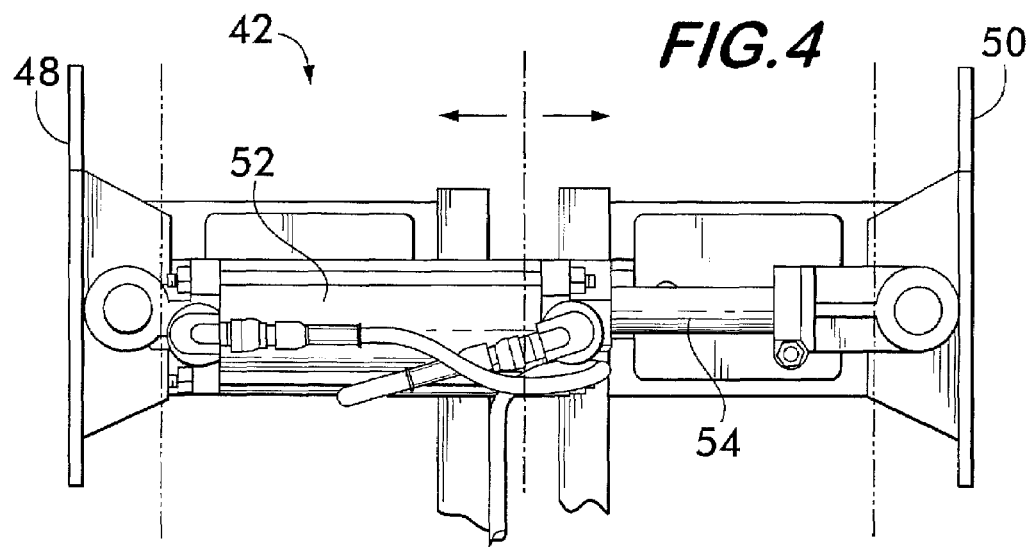
FIGS. 4 and 5 are elevational view of the gripper assembly of the self-propelled vehicle according to the present invention.
Figure 5:
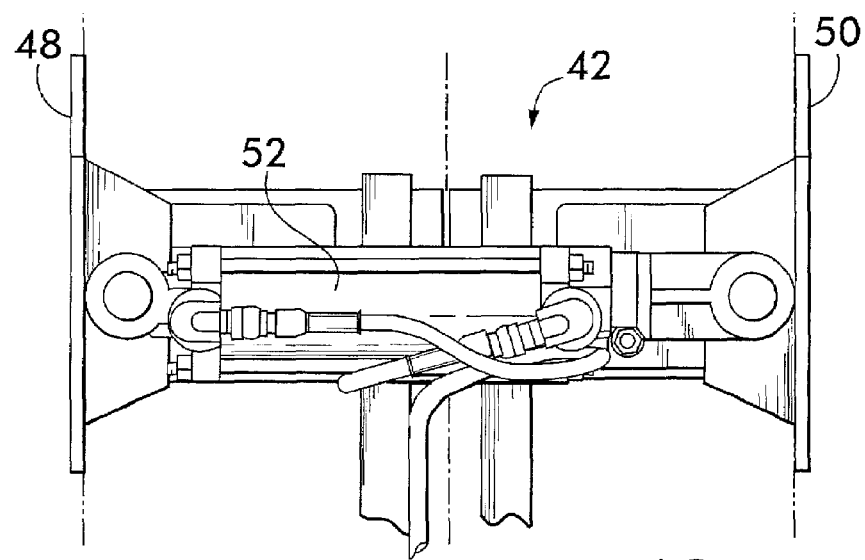
Figure 6:
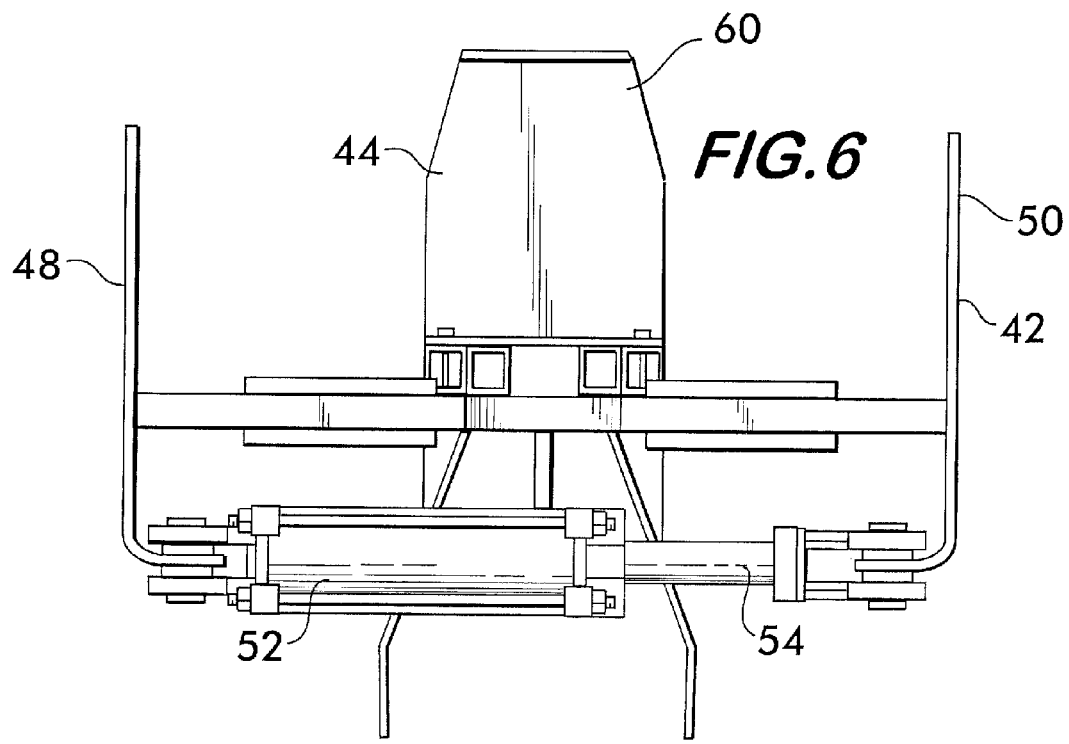
FIGS. 6 and 7 are top plan views of the gripper assemblies illustrated in FIGS. 4 and 5, respectively.
Figure 7:
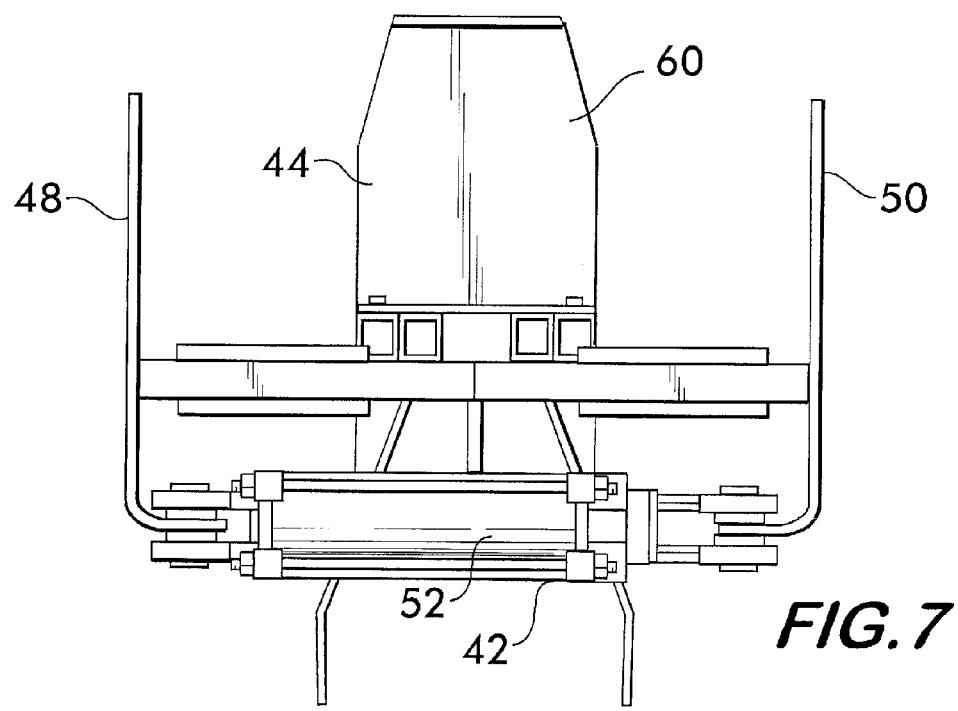

As best illustrated in FIGS. 3-8, the gripper assembly 42 includes an opposed pair of grippers 48 and 50 interconnected by a hydraulically or pneumatically operated cylinder vessel 52 and a piston 54. In FIGS. 4 and 6, the piston 54 is illustrated in its fully extended position relative to cylinder 52. This results in grippers 48 and 50 extending outwardly so that the end 16 of the cart 10 can be introduced or removed from between the grippers 48 and 50. In FIGS. 5 and 7, the piston 54 is contracted into the cylinder 52 so that the grippers 48 and 50 can engage and grip the opposite lateral sides of the cart 10.

Figure 8:
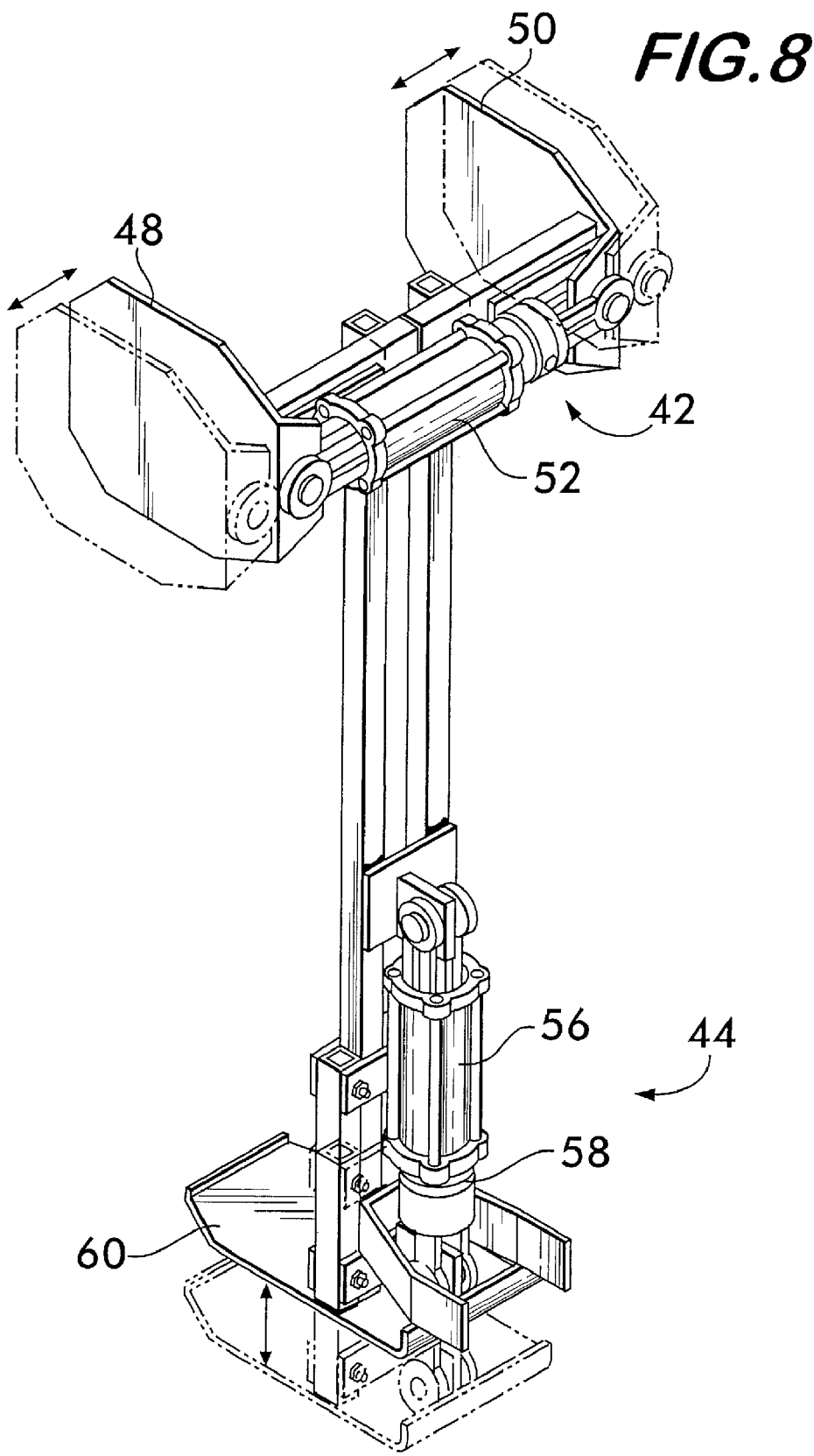
FIG. 8 is a prospective view of the gripper and lifting assemblies of the self-propelled vehicle according to the present invention.

As best illustrated in FIG. 8, the lifter assembly 44 also includes a cylinder 56 and piston 58 arrangement. When the piston 58 is extended from the cylinder 56, the lifter plate 60 extends at an elevation permitting it to be located underneath a base 62 of the cart 10. For instance, see FIG. 1. However, when the piston 58 is contracted into cylinder 56, the plate 60 moves upwardly thereby lifting the end 16 of the cart 10 a spaced distance above the floor 46, for instance as illustrated in FIG. 2. After the end 16 of the cart 10 is gripped and lifted by the vehicle, it can be driven to a desired location.

The present invention also provides a method for transferring poultry in a wheeled multi-tier cage 10 from a first location to a second location. As discussed above, the cage or cart 10 has a set of fixed wheels 14 and a set of caster wheels 18 enabling the cage 10 to be displaced and pivoted on a support surface 46, such as the floor of a poultry house. A self-propelled vehicle 22 is used to grip the cage 10 with gripper assembly 48 laterally above the fixed wheels 14 and to vertically lift the end 16 of the gripped cage 10 with lifter assembly 44 to elevate the fixed wheels 14 above the floor 46. In this condition, the caster wheels 18 of the cage 10 opposite the vehicle 22 remain in contact with the floor 46 as does the wheels 24 and 28 of the vehicle 22. Thereafter, the cage 10 is displaced relative to the floor 46 by forward and/or reverse operation of the vehicle 22. This arrangement permits the cart-vehicle combination to pivot and maneuver within narrow spaces around obstacles and tight corners.

As discussed previously, preferably an operators of the vehicle 22 distributes carts 10 throughout the entire poultry house. After the carts 10 are loaded and/or unloaded, the vehicle 22 collects the carts 10 and move them under the force of the drive wheels 24 of the vehicle 22 to a predetermined destination, such as onto a truck bed. Each cage 10 can be released by the vehicle 22 by lowering the lifting assembly 44 and expanding the gripper assembly 42.

While preferred vehicles and methods have been described in detail, various modifications, alternations, and changes may be made without departing from the spirit and scope of the transporter and method according to the present invention as defined in the appended claims.

The invention claimed is:

1. Apparatus for transporting poultry from a first location to a second location within a poultry house, comprising:

a multi-tiered, multi-compartmented poultry cart having a substantially rectangular frame of a size permitting said cart to pass through narrow aisles within the poultry house, said cart having a set of fixed wheels at one end and a set of caster wheels at an opposite end, and said cart being sized to hold about 150 to 200 live chickens; and a separate self-propelled transporter for pushing and pulling said poultry cart while said set of caster wheels of said poultry cart remain in contact with an underlying floor surface, said self-propelled transporter having a gripper assembly laterally engaging said poultry cart above said set of fixed wheels to stabilize said cart and a lifter assembly disposed below the gripper assembly elevating said one end of said poultry cart adjacent said fixed set of wheels off the underlying floor surface while said set of caster wheels of said poultry cart remains in contact with the underlying floor surface;

said self-propelled transporter having a pair of drive wheels enabling translation along the underlying floor surface and a frame connecting said gripper assembly and said lifter assembly to said transporter adjacent said drive wheels;

whereby the poultry cart may be coupled to the transporter and decoupled therefrom for efficiently transporting poultry from the first location to the second location.

2. Apparatus according to claim 1, wherein said transporter includes a platform for supporting an operator while moving said poultry cage from one location to the other.

3. Apparatus according to claim 1, wherein said drive wheels are located at a front end of said transporter and said transporter further includes a set of caster wheels located at a rear end of said transporter such that said gripped and raised poetry cart and said transporter in combination are supported on the underlying floor surface by said drive wheels of said transporter adjacent said one end of said cart, said set of caster wheels of said poultry cart at said opposite end of said poultry cart, and said set of caster wheels at said rear end of said transporter thereby providing the combination with essentially zero-turning radius capability so that said combination is maneuverable through the narrow aisles and around obstacles and tight corners within limited confines of the poultry house.

4. Apparatus according to claim 3, wherein said self-propelled transporter has a narrow front profile sufficient to permit said self-propelled transporter to be driven through the narrow aisles of the poultry house.

5. Apparatus according to claim 4, wherein said narrow front profile is of a width of no more than about 21.5 inches.

6. Apparatus according to claim 5, wherein said poultry cart is carrying about 150 to 200 live chickens and weights about 600 to 800 pounds.

7. Apparatus according to claim 6, wherein said drive wheels of said self-propelled transporter are powered by LP gas contained in a tank on said transporter.

8. Apparatus according to claim 4, wherein said gripper assembly of said transporter includes an opposed pair of grippers engaging and gripping opposite lateral sides of said poultry cart, said opposed pair of grippers are interconnected by a hydraulically or pneumatically operated cylinder and piston.

9. Apparatus according to claim 8, wherein said lifter assembly of said transporter includes a cylinder, a piston and a lifter plate that extends underneath and engages a base of said poultry cart such that contracting of said piston within said cylinder causes said lifter plate to elevate said one end of said poultry cart.

10. A method of transferring poultry within narrow confines of a poultry house with said self-propelled transporter and said poultry cart according to claim 1, said method comprising the steps of:

gripping said one end of said poultry cart laterally above said set of fixed wheels with said gripper assembly of said transporter;

lifting said one end of said gripped poultry cart vertically to elevate the fixed wheels above the underlying floor surface while permitting said set of caster wheels on said opposite end of said poultry cart to remain in contact with the underlying floor surface; and while being gripped and lifted, displacing said poultry cart within the narrow confines of the poultry house with the self-propelled transporter.

11. A method according to claim 10, including the steps of pivoting said poultry cart on its casters while advancing it along the underlying floor surface.

12. A method according to claim 11, including the steps of releasing the poultry cart from the gripper and lifter assembly of said self-propelled transporter at a predetermined location.

* * * * *